(12) United States Patent
Cheng et al.

(10) Patent No.: US 11,836,642 B2
(45) Date of Patent: *Dec. 5, 2023

(54) METHOD, SYSTEM, AND COMPUTER PROGRAM PRODUCT FOR DYNAMICALLY SCHEDULING MACHINE LEARNING INFERENCE JOBS WITH DIFFERENT QUALITY OF SERVICES ON A SHARED INFRASTRUCTURE

(71) Applicant: Visa International Service Association, San Francisco, CA (US)

(72) Inventors: Yinhe Cheng, Austin, TX (US); Yu Gu, Austin, TX (US); Igor Karpenko, Dublin, CA (US); Peter Walker, Cedar Park, TX (US); Ranglin Lu, Austin, TX (US); Subir Roy, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,193

(22) Filed: Dec. 23, 2022

(65) Prior Publication Data

US 2023/0130887 A1 Apr. 27, 2023

Related U.S. Application Data

(63) Continuation of application No. 16/745,932, filed on Jan. 17, 2020, now Pat. No. 11,562,263.

(51) Int. Cl.
*G06F 9/46* (2006.01)
*G06N 5/04* (2023.01)
*G06F 9/50* (2006.01)
*G06N 20/00* (2019.01)

(52) U.S. Cl.
CPC .............. *G06N 5/04* (2013.01); *G06F 9/5011* (2013.01); *G06N 20/00* (2019.01)

(58) Field of Classification Search
CPC ...................................................... G06F 9/5011
See application file for complete search history.

(56) References Cited

U.S. PATENT DOCUMENTS 9,495,211 B1 11/2016 Helstroom et al.
9,575,811 B2 2/2017 Farhan et al.
9,678,798 B2 6/2017 Farhan et al.
9,684,540 B2 6/2017 Farhan et al.
10,127,080 B2 11/2018 Farhan et al.

*Primary Examiner* — Gregory A Kessler
(74) *Attorney, Agent, or Firm* — THE WEBB LAW FIRM

(57) ABSTRACT

A method, system, and computer program product for dynamically scheduling machine learning inference jobs receive or determine a plurality of performance profiles associated with a plurality of system resources, wherein each performance profile is associated with a machine learning model; receive a request for system resources for an inference job associated with the machine learning model; determine a system resource of the plurality of system resources for processing the inference job associated with the machine learning model based on the plurality of performance profiles and a quality of service requirement associated with the inference job; assign the system resource to the inference job for processing the inference job; receive result data associated with processing of the inference job with the system resource; and update based on the result data, a performance profile of the plurality of the performance profiles associated with the system resource and the machine learning model.

20 Claims, 5 Drawing Sheets

METHOD, SYSTEM, AND COMPUTER PROGRAM PRODUCT FOR DYNAMICALLY SCHEDULING MACHINE LEARNING INFERENCE JOBS WITH DIFFERENT QUALITY OF SERVICES ON A SHARED INFRASTRUCTURE

CROSS-REFERENCE TO RELATED APPLICATION

This application is a continuation of U.S. patent application Ser. No. 16/745,932 filed, Jan. 17, 2020, the disclosure of which is hereby incorporated by reference in its entirety.

BACKGROUND

1. Field

This disclosure relates generally to systems, devices, products, apparatus, and methods for scheduling machine learning inference jobs, and in some embodiments or aspects, to a method, a system, and a product for dynamically scheduling machine learning inference jobs with different quality of services on a shared infrastructure.

2. Technical Considerations

Many companies are building shared common machine learning platforms. Common machine learning platforms are also available in the public cloud, such as Amazon SageMaker, and/or the like. For example, Amazon SageMaker is a fully managed service that provides developers and data scientists with the ability to build, train, and deploy machine learning (ML) models.

Different machine learning models may have different quality of service requirements. For example, a fraud detection model for detecting fraudulent transactions may need to detect fraud within a few milliseconds, whereas web interactive applications may be able to tolerate hundreds of milliseconds of latency.

Different system resources may have different processing capabilities. For example, a central processing unit (CPU) typically has a much higher clock frequency than a graphics processing unit (GPU) and, therefore, a CPU is typically much faster at processing individual inference jobs. Further, an amount of available RAM for a CPU is typically in a range of hundreds of gigabytes to tens of terabytes, whereas an amount of available RAM for a GPU is typically in a range of tens of gigabytes. However, a GPU typically has a much larger number of cores (e.g., thousands of cores, etc.) than a CPU (e.g., tens of cores, etc.), which may make a GPU more suited for other processing tasks, such as processing batch requests, and/or the like. For example, a GPU may operate as a blocking device, which means that an executing task cannot be interrupted and, therefore, to fully leverage GPU resources, multiple requests may be batched. Similarly, different systems in a shared infrastructure, such as a first system including a first CPU and a first GPU and a second system including a second CPU and a second GPU, may have different processing capabilities, which may cause the first system to be better suited for certain processing tasks, such as those with higher quality of service requirements, and/or the like, than the second system.

A common machine learning platform may not manage task or job assignment to satisfy quality of service requirements and efficient resource utilization due to the different quality of service requirements of different machine learning models and applications, as well as heterogenous system resources, such as hardware accelerators, and/or the like. Accordingly, there is a need in the art for improving scheduling of machine learning inference jobs on shared platforms or infrastructures.

SUMMARY

Accordingly, provided are improved systems, devices, products, apparatus, and/or methods for scheduling machine learning inference jobs.

According to some non-limiting embodiments or aspects, provided is a computer-implemented method including: receiving or determining, with at least one processor, a plurality of performance profiles associated with a plurality of system resources, each performance profile being associated with a machine learning model; receiving, with at least one processor, a request for system resources for an inference job associated with the machine learning model; determining, with at least one processor, a system resource of the plurality of system resources for processing the inference job associated with the machine learning model based on the plurality of performance profiles and a quality of service requirement associated with the inference job; assigning, with at least one processor, the system resource to the inference job for processing the inference job; receiving, with at least one processor, result data associated with processing of the inference job with the system resource; and updating, with at least one processor, based on the result data, a performance profile of the plurality of the performance profiles associated with the system resource and the machine learning model.

In some non-limiting embodiments or aspects, each performance profile for each system resource includes a latency associated with the machine learning model for that system resource, a throughput associated with the machine learning model for that system resource, and an availability of that system resource for processing the inference job associated with the machine learning model.

In some non-limiting embodiments or aspects, the plurality of system resources include at least one central processing unit (CPU) and at least one graphics processing unit (GPU).

In some non-limiting embodiments or aspects, the quality of service requirement includes at least one of a latency requirement for the inference job associated with the machine learning model and a throughput requirement for the inference job associated with the machine learning model.

In some non-limiting embodiments or aspects, determining the system resource of the plurality of system resources for processing the inference job associated with the machine learning model includes assigning the inference job to one of a plurality of job queues based on the quality of service requirement associated with the inference job, wherein the plurality of job queues are associated with a plurality of different priorities, and wherein determining the system resource of the plurality of system resources for processing the inference job associated with the machine learning model is further based on a priority of a job queue to which the inference job is assigned.

In some non-limiting embodiments or aspects, the method further includes: receiving or determining, with at least one processor, a plurality of further performance profiles associated with the plurality of system resources, each further performance profile being associated with a further machine learning model different than the machine learning model;

receiving, with at least one processor, a further request for system resources for a further inference job associated with the further machine learning model; determining, with at least one processor, a further system resource of the plurality of system resources for processing the further inference job associated with the further machine learning model based on the plurality of further performance profiles and a further quality of service requirement associated with the further inference job; assigning, with at least one processor, the further system resource to the inference job for processing the inference job; receiving, with at least one processor, further result data associated with processing of the further inference job with the further system resource; and updating, with at least one processor, based on the further result data, a further performance profile of the plurality of the performance profiles associated with the system resource and the further machine learning model.

In some non-limiting embodiments or aspects, the first system resource and the further system resource include a same system resource.

According to some non-limiting embodiments or aspects, provided is a computing system including: one or more processors programmed and/or configured to: receive or determine a plurality of performance profiles associated with a plurality of system resources, each performance profile being associated with a machine learning model; receive a request for system resources for an inference job associated with the machine learning model; determine a system resource of the plurality of system resources for processing the inference job associated with the machine learning model based on the plurality of performance profiles and a quality of service requirement associated with the inference job; assign the system resource to the inference job for processing the inference job; receive result data associated with processing of the inference job with the system resource; and update, based on the result data, a performance profile of the plurality of the performance profiles associated with the system resource and the machine learning model.

In some non-limiting embodiments or aspects, each performance profile for each system resource includes a latency associated with the machine learning model for that system resource, a throughput associated with the machine learning model for that system resource, and an availability of that system resource for processing the inference job associated with the machine learning model.

In some non-limiting embodiments or aspects, the plurality of system resources include at least one central processing unit (CPU) and at least one graphics processing unit (GPU).

In some non-limiting embodiments or aspects, the quality of service requirement includes at least one of a latency requirement for the inference job associated with the machine learning model and a throughput requirement for the inference job associated with the machine learning model.

In some non-limiting embodiments or aspects, determining the system resource of the plurality of system resources for processing the inference job associated with the machine learning model includes assigning the inference job to one of a plurality of job queues based on the quality of service requirement associated with the inference job, wherein the plurality of job queues are associated with a plurality of different priorities, and wherein determining the system resource of the plurality of system resources for processing the inference job associated with the machine learning model is further based on a priority of a job queue to which the inference job is assigned.

In some non-limiting embodiments or aspects, the one or more processors are further programmed and/or configured to: receive or determine a plurality of further performance profiles associated with the plurality of system resources, each further performance profile being associated with a further machine learning model different than the machine learning model; receive a further request for system resources for a further inference job associated with the further machine learning model; determine a further system resource of the plurality of system resources for processing the further inference job associated with the further machine learning model based on the plurality of further performance profiles and a further quality of service requirement associated with the further inference job; assign the further system resource to the inference job for processing the inference job; receive further result data associated with processing of the further inference job with the further system resource; and update based on the further result data, a further performance profile of the plurality of the performance profiles associated with the system resource and the further machine learning model.

In some non-limiting embodiments or aspects, the first system resource and the further system resource include a same system resource.

According to some non-limiting embodiments or aspects, provided is a computer program product including at least one non-transitory computer-readable medium including program instructions that, when executed by at least one processor, cause the at least one processor to: receive or determine a plurality of performance profiles associated with a plurality of system resources, each performance profile being associated with a machine learning model; receive a request for system resources for an inference job associated with the machine learning model; determine a system resource of the plurality of system resources for processing the inference job associated with the machine learning model based on the plurality of performance profiles and a quality of service requirement associated with the inference job; assign the system resource to the inference job for processing the inference job; receive result data associated with processing of the inference job with the system resource; and update, based on the result data, a performance profile of the plurality of the performance profiles associated with the system resource and the machine learning model.

In some non-limiting embodiments or aspects, each performance profile for each system resource includes a latency associated with the machine learning model for that system resource, a throughput associated with the machine learning model for that system resource, and an availability of that system resource for processing the inference job associated with the machine learning model.

In some non-limiting embodiments or aspects, the plurality of system resources include at least one central processing unit (CPU) and at least one graphics processing unit (GPU).

In some non-limiting embodiments or aspects, the quality of service requirement includes at least one of a latency requirement for the inference job associated with the machine learning model and a throughput requirement for the inference job associated with the machine learning model.

In some non-limiting embodiments or aspects, determining the system resource of the plurality of system resources for processing the inference job associated with the machine learning model includes assigning the inference job to one of a plurality of job queues based on the quality of service requirement associated with the inference job, wherein the plurality of job queues are associated with a plurality of different priorities, and wherein determining the system resource of the plurality of system resources for processing the inference job associated with the machine learning model is further based on a priority of a job queue to which the inference job is assigned.

In some non-limiting embodiments or aspects, the one or more processors are further programmed and/or configured to: receive or determine a plurality of further performance profiles associated with the plurality of system resources, each further performance profile being associated with a further machine learning model different than the machine learning model; receive a further request for system resources for a further inference job associated with the further machine learning model; determine a further system resource of the plurality of system resources for processing the further inference job associated with the further machine learning model based on the plurality of further performance profiles and a further quality of service requirement associated with the further inference job; assign the further system resource to the inference job for processing the inference job; receive further result data associated with processing of the further inference job with the further system resource; and update based on the further result data, a further performance profile of the plurality of the performance profiles associated with the system resource and the further machine learning model.

Further embodiments or aspects are set forth in the following numbered clauses:

Clause 1. A computer-implemented method comprising: receiving or determining, with at least one processor, a plurality of performance profiles associated with a plurality of system resources, wherein each performance profile is associated with a machine learning model; receiving, with at least one processor, a request for system resources for an inference job associated with the machine learning model; determining, with at least one processor, a system resource of the plurality of system resources for processing the inference job associated with the machine learning model based on the plurality of performance profiles and a quality of service requirement associated with the inference job; assigning, with at least one processor, the system resource to the inference job for processing the inference job; receiving, with at least one processor, result data associated with processing of the inference job with the system resource; and updating, with at least one processor, based on the result data, a performance profile of the plurality of the performance profiles associated with the system resource and the machine learning model.

Clause 2. The computer-implemented method of clause 1, wherein each performance profile for each system resource includes a latency associated with the machine learning model for that system resource, a throughput associated with the machine learning model for that system resource, and an availability of that system resource for processing the inference job associated with the machine learning model.

Clause 3. The computer-implemented method of clauses 1 or 2, wherein the plurality of system resources include at least one central processing unit (CPU) and at least one graphics processing unit (GPU).

Clause 4. The computer-implemented method of any of clauses 1-3, wherein the quality of service requirement includes at least one of a latency requirement for the inference job associated with the machine learning model and a throughput requirement for the inference job associated with the machine learning model.

Clause 5. The computer-implemented method of any of clauses 1-4, wherein determining the system resource of the plurality of system resources for processing the inference job associated with the machine learning model includes assigning the inference job to one of a plurality of job queues based on the quality of service requirement associated with the inference job, wherein the plurality of job queues are associated with a plurality of different priorities, and wherein determining the system resource of the plurality of system resources for processing the inference job associated with the machine learning model is further based on a priority of a job queue to which the inference job is assigned.

Clause 6. The computer-implemented method of any of clauses 1-5, further comprising: receiving or determining, with at least one processor, a plurality of further performance profiles associated with the plurality of system resources, wherein each further performance profile is associated with a further machine learning model different than the machine learning model; receiving, with at least one processor, a further request for system resources for a further inference job associated with the further machine learning model; determining, with at least one processor, a further system resource of the plurality of system resources for processing the further inference job associated with the further machine learning model based on the plurality of further performance profiles and a further quality of service requirement associated with the further inference job; assigning, with at least one processor, the further system resource to the inference job for processing the inference job; receiving, with at least one processor, further result data associated with processing of the further inference job with the further system resource; and updating, with at least one processor, based on the further result data, a further performance profile of the plurality of the performance profiles associated with the system resource and the further machine learning model.

Clause 7. The computer-implemented method of any of clauses 1-6, wherein the first system resource and the further system resource include a same system resource.

Clause 8. A computing system comprising: one or more processors programmed and/or configured to: receive or determine a plurality of performance profiles associated with a plurality of system resources, wherein each performance profile is associated with a machine learning model; receive a request for system resources for an inference job associated with the machine learning model; determine a system resource of the plurality of system resources for processing the inference job associated with the machine learning model based on the plurality of performance profiles and a quality of service requirement associated with the inference job; assign the system resource to the inference job for processing the inference job; receive result data associated with processing of the inference job with the system resource; and update, based on the result data, a performance profile of the plurality of the performance profiles associated with the system resource and the machine learning model.

Clause 9. The computing system of clause 8, wherein each performance profile for each system resource includes a latency associated with the machine learning model for that system resource, a throughput associated with the machine learning model for that system resource, and an availability of that system resource for processing the inference job associated with the machine learning model.

Clause 10. The computing system of clauses 8 or 9, wherein the plurality of system resources include at least one central processing unit (CPU) and at least one graphics processing unit (GPU).

Clause 11. The computing system of any of clauses 8-10, wherein the quality of service requirement includes at least one of a latency requirement for the inference job associated with the machine learning model and a throughput requirement for the inference job associated with the machine learning model.

Clause 12. The computing system of any of clauses 8-11, wherein determining the system resource of the plurality of system resources for processing the inference job associated with the machine learning model includes assigning the inference job to one of a plurality of job queues based on the quality of service requirement associated with the inference job, wherein the plurality of job queues are associated with a plurality of different priorities, and wherein determining the system resource of the plurality of system resources for processing the inference job associated with the machine learning model is further based on a priority of a job queue to which the inference job is assigned.

Clause 13. The computing system of any of clauses 8-12, wherein the one or more processors are further programmed and/or configured to: receive or determine a plurality of further performance profiles associated with the plurality of system resources, wherein each further performance profile is associated with a further machine learning model different than the machine learning model; receive a further request for system resources for a further inference job associated with the further machine learning model; determine a further system resource of the plurality of system resources for processing the further inference job associated with the further machine learning model based on the plurality of further performance profiles and a further quality of service requirement associated with the further inference job; assign the further system resource to the inference job for processing the inference job; receive further result data associated with processing of the further inference job with the further system resource; and update based on the further result data, a further performance profile of the plurality of the performance profiles associated with the system resource and the further machine learning model.

Clause 14. The computing system method of any of clauses 8-13, wherein the first system resource and the further system resource include a same system resource.

Clause 15. A computer program product comprising at least one non-transitory computer-readable medium including program instructions that, when executed by at least one processor, cause the at least one processor to: receive or determine a plurality of performance profiles associated with a plurality of system resources, wherein each performance profile is associated with a machine learning model; receive a request for system resources for an inference job associated with the machine learning model; determine a system resource of the plurality of system resources for processing the inference job associated with the machine learning model based on the plurality of performance profiles and a quality of service requirement associated with the inference job; assign the system resource to the inference job for processing the inference job; receive result data associated with processing of the inference job with the system resource; and update, based on the result data, a performance profile of the plurality of the performance profiles associated with the system resource and the machine learning model.

Clause 16. The computer program product of clause 15, wherein each performance profile for each system resource includes a latency associated with the machine learning model for that system resource, a throughput associated with the machine learning model for that system resource, and an availability of that system resource for processing the inference job associated with the machine learning model.

Clause 17. The computer program product of clauses 15 or 16, wherein the plurality of system resources include at least one central processing unit (CPU) and at least one graphics processing unit (GPU).

Clause 18. The computer program product of any of clauses 15-17, wherein the quality of service requirement includes at least one of a latency requirement for the inference job associated with the machine learning model and a throughput requirement for the inference job associated with the machine learning model.

Clause 19. The computer program product of any of clauses 15-18, wherein determining the system resource of the plurality of system resources for processing the inference job associated with the machine learning model includes assigning the inference job to one of a plurality of job queues based on the quality of service requirement associated with the inference job, wherein the plurality of job queues are associated with a plurality of different priorities, and wherein determining the system resource of the plurality of system resources for processing the inference job associated with the machine learning model is further based on a priority of a job queue to which the inference job is assigned.

Clause 20. The computer program product of any of clauses 15-19, wherein the one or more processors are further programmed and/or configured to: receive or determine a plurality of further performance profiles associated with the plurality of system resources, wherein each further performance profile is associated with a further machine learning model different than the machine learning model; receive a further request for system resources for a further inference job associated with the further machine learning model; determine a further system resource of the plurality of system resources for processing the further inference job associated with the further machine learning model based on the plurality of further performance profiles and a further quality of service requirement associated with the further inference job; assign the further system resource to the inference job for processing the inference job; receive further result data associated with processing of the further inference job with the further system resource; and update based on the further result data, a further performance profile of the plurality of the performance profiles associated with the system resource and the further machine learning model.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DESCRIPTION

Figure 1A:
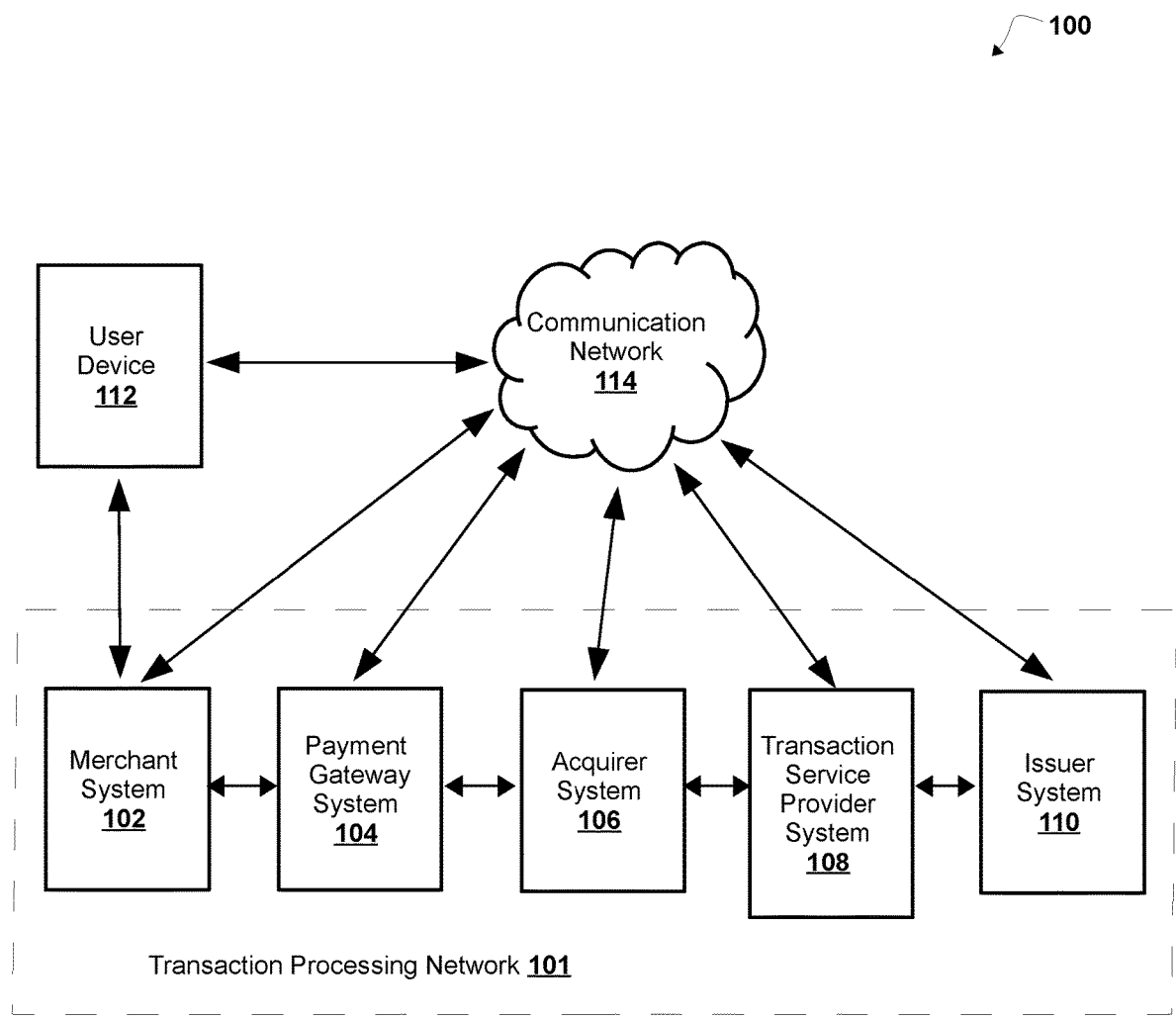
FIG. 1A is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "transaction service provider" may refer to an entity that receives transaction authorization requests from merchants or other entities and provides guarantees of payment, in some cases through an agreement between the transaction service provider and an issuer institution. The terms "transaction service provider" and "transaction service provider system" may also refer to one or more computer systems operated by or on behalf of a transaction service provider, such as a transaction processing system executing one or more software applications. A transaction processing system may include one or more server computers with one or more processors and, in some non-limiting embodiments or aspects, may be operated by or on behalf of a transaction service provider.

As used herein, the term "account identifier" may include one or more Primary Account Numbers (PAN), tokens, or other identifiers (e.g., a globally unique identifier (GUID), a universally unique identifier (UUID), etc.) associated with a customer account of a user (e.g., a customer, a consumer, and/or the like). The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more databases such that they can be used to conduct a transaction without directly using the original account identifier. In some examples, an original account identifier, such as a PAN, may be associated with a plurality of tokens for different individuals or purposes.

As used herein, the terms "issuer institution," "portable financial device issuer," "issuer," or "issuer bank" may refer to one or more entities that provide one or more accounts to a user (e.g., a customer, a consumer, an entity, an organization, and/or the like) for conducting transactions (e.g., payment transactions), such as initiating credit card payment transactions and/or debit card payment transactions. For example, an issuer institution may provide an account identifier, such as a personal account number (PAN), to a user that uniquely identifies one or more accounts associated with that user. The account identifier may be embodied on a portable financial device, such as a physical financial instrument (e.g., a payment card), and/or may be electronic and used for electronic payments. In some non-limiting embodiments or aspects, an issuer institution may be associated with a bank identification number (BIN) that uniquely identifies the issuer institution. As used herein "issuer institution system" may refer to one or more computer systems operated by or on behalf of an issuer institution, such as a server computer executing one or more software applications. For example, an issuer institution system may include one or more authorization servers for authorizing a payment transaction.

As used herein, the term "merchant" may refer to an individual or entity that provides products and/or services, or access to products and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computer device" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Wallet™, Android Pay®, Apple Pay®, Samsung Pay®, and/or other like electronic payment systems. In some non-limiting examples, an issuer bank may be an electronic wallet provider.

As used herein, the term "portable financial device" or "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a mobile device executing an electronic wallet application, a personal digital assistant (PDA), a security card, an access card, a wireless terminal, and/or a transponder, as examples. The portable financial device may include a volatile or a non-volatile memory to store information, such as an account identifier and/or a name of the account holder.

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system. As used herein, the term "data center" may include one or more servers, or other computing devices, and/or databases.

As used herein, the term "acquirer" may refer to an entity licensed by the transaction service provider and/or approved by the transaction service provider to originate transactions using a portable financial device of the transaction service provider. Acquirer may also refer to one or more computer systems operated by or on behalf of an acquirer, such as a server computer executing one or more software applications (e.g., "acquirer server"). An "acquirer" may be a merchant bank, or in some cases, the merchant system may be the acquirer. The transactions may include original credit transactions (OCTs) and account funding transactions (AFTs). The acquirer may be authorized by the transaction service provider to sign merchants of service providers to originate transactions using a portable financial device of the transaction service provider. The acquirer may contract with payment facilitators to enable the facilitators to sponsor merchants. The acquirer may monitor compliance of the payment facilitators in accordance with regulations of the transaction service provider. The acquirer may conduct due diligence of payment facilitators and ensure that proper due diligence occurs before signing a sponsored merchant. Acquirers may be liable for all transaction service provider programs that they operate or sponsor. Acquirers may be responsible for the acts of its payment facilitators and the merchants it or its payment facilitators sponsor.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

Provided are improved systems, devices, products, apparatus, and/or methods for scheduling machine learning inference jobs.

Non-limiting embodiments or aspects of the present disclosure are directed to systems, methods, and computer program products for managing model updates that receive or determine a plurality of performance profiles associated with a plurality of system resources, wherein each performance profile is associated with a machine learning model; receive a request for system resources for an inference job associated with the machine learning model; determine a system resource of the plurality of system resources for processing the inference job associated with the machine learning model based on the plurality of performance profiles and a quality of service requirement associated with the inference job; assign the system resource to the inference job for processing the inference job; receive result data associated with processing of the inference job with the system resource; and update based on the result data, a performance profile of the plurality of the performance profiles associated with the system resource and the machine learning model. In this way, non-limiting embodiments or aspects of the present disclosure may determine performance profiles of system resources with respect to individual machine learning models or processes and update the performance profiles after inference jobs are executed so that the performance profiles are always current with respect to the individual machine learning models or processes, which may enable quality of service requirements for different machine learning models and applications to be satisfied and more efficient system resource utilization in a common machine learning platform or shared infrastructure.

Referring now to FIG. 1A, FIG. 1A is a diagram of an example environment 100 in which devices, systems, methods, and/or products described herein, may be implemented. As shown in FIG. 1A, environment 100 includes transaction processing network 101, which may include merchant system 102, payment gateway system 104, acquirer system 106, transaction service provider system 108, and/or issuer system 110, user device 112, and/or communication network 114. Transaction processing network 101, merchant system 102, payment gateway system 104, acquirer system 106, transaction service provider system 108, issuer system 110, and/or user device 112 may interconnect (e.g., establish a connection to communicate, etc.) via wired connections, wireless connections, or a combination of wired and wireless connections.

Merchant system 102 may include one or more devices capable of receiving information and/or data from payment gateway system 104, acquirer system 106, transaction service provider system 108, issuer system 110, and/or user device 112 (e.g., via communication network 114, etc.) and/or communicating information and/or data to payment gateway system 104, acquirer system 106, transaction service provider system 108, issuer system 110, and/or user device 112 (e.g., via communication network 114, etc.). Merchant system 102 may include a device capable of receiving information and/or data from user device 112 via a communication connection (e.g., an NFC communication connection, an RFID communication connection, a Bluetooth® communication connection, etc.) with user device 112, and/or communicating information and/or data to user device 112 via the communication connection. For example, merchant system 102 may include a computing device, such as a server, a group of servers, a client device, a group of client devices, and/or other like devices. In some non-limiting embodiments or aspects, merchant system 102 may be associated with a merchant as described herein. In some non-limiting embodiments or aspects, merchant system 102 may include one or more devices, such as computers, computer systems, and/or peripheral devices capable of being used by a merchant to conduct a payment transaction with a user. For example, merchant system 102 may include a POS device and/or a POS system.

Payment gateway system 104 may include one or more devices capable of receiving information and/or data from merchant system 102, acquirer system 106, transaction service provider system 108, issuer system 110, and/or user device 112 (e.g., via communication network 114, etc.) and/or communicating information and/or data to merchant system 102, acquirer system 106, transaction service provider system 108, issuer system 110, and/or user device 112 (e.g., via communication network 114, etc.). For example, payment gateway system 104 may include a computing device, such as a server, a group of servers, and/or other like devices. In some non-limiting embodiments or aspects, payment gateway system 104 is associated with a payment gateway as described herein.

Acquirer system 106 may include one or more devices capable of receiving information and/or data from merchant system 102, payment gateway system 104, transaction service provider system 108, issuer system 110, and/or user device 112 (e.g., via communication network 114, etc.) and/or communicating information and/or data to merchant system 102, payment gateway system 104, transaction service provider system 108, issuer system 110, and/or user device 112 (e.g., via communication network 114, etc.). For example, acquirer system 106 may include a computing device, such as a server, a group of servers, and/or other like devices. In some non-limiting embodiments or aspects, acquirer system 106 may be associated with an acquirer as described herein.

Transaction service provider system 108 may include one or more devices capable of receiving information and/or data from merchant system 102, payment gateway system 104, acquirer system 106, issuer system 110, and/or user device 112 (e.g., via communication network 114, etc.) and/or communicating information and/or data to merchant system 102, payment gateway system 104, acquirer system 106, issuer system 110, and/or user device 112 (e.g., via communication network 114, etc.). For example, transaction service provider system 108 may include a computing device, such as a server (e.g., a transaction processing server, etc.), a group of servers, and/or other like devices. In some non-limiting embodiments or aspects, transaction service provider system 108 may be associated with a transaction service provider as described herein. In some non-limiting embodiments or aspects, transaction service provider 108 may include and/or access one or more one or more internal and/or external databases including account data, transaction data, input data, quality of service requirements, performance profiles, result data, feature profiles, model states, model policies, sequence numbers, and/or the like.

Issuer system 110 may include one or more devices capable of receiving information and/or data from merchant system 102, payment gateway system 104, acquirer system 106, transaction service provider system 108, and/or user device 112 (e.g., via communication network 114, etc.) and/or communicating information and/or data to merchant system 102, payment gateway system 104, acquirer system 106, transaction service provider system 108, and/or user device 112 (e.g., via communication network 114, etc.). For example, issuer system 110 may include a computing device, such as a server, a group of servers, and/or other like devices. In some non-limiting embodiments or aspects, issuer system 110 may be associated with an issuer institution as described herein. For example, issuer system 110 may be associated with an issuer institution that issued a payment account or instrument (e.g., a credit account, a debit account, a credit card, a debit card, etc.) to a user (e.g., a user associated with user device 112, etc.).

In some non-limiting embodiments or aspects, transaction processing network 101 includes a plurality of systems in a communication path for processing a transaction. For example, transaction processing network 101 may include merchant system 102, payment gateway system 104, acquirer system 106, transaction service provider system 108, and/or issuer system 110 in a communication path (e.g., a communication path, a communication channel, a communication network, etc.) for processing an electronic payment transaction. As an example, transaction processing network 101 may process (e.g., receive, initiate, conduct, authorize, etc.) an electronic payment transaction via the communication path between merchant system 102, payment gateway system 104, acquirer system 106, transaction service provider system 108, and/or issuer system 110.

User device 112 may include one or more devices capable of receiving information and/or data from merchant system 102, payment gateway system 104, acquirer system 106, transaction service provider system 108, and/or issuer system 110 (e.g., via communication network 114, etc.) and/or communicating information and/or data to merchant system 102, payment gateway system 104, acquirer system 106, transaction service provider system 108, and/or issuer system 110 (e.g., via communication network 114, etc.). For example, user device 112 may include a client device and/or the like. In some non-limiting embodiments or aspects, user device 112 may be capable of receiving information (e.g., from merchant system 102, etc.) via a short range wireless communication connection (e.g., an NFC communication connection, an RFID communication connection, a Bluetooth® communication connection, and/or the like), and/or communicating information (e.g., to merchant system 102, etc.) via a short range wireless communication connection. In some non-limiting embodiments or aspects, user device 112 may include an application associated with user device 112, such as an application stored on user device 112, a mobile application (e.g., a mobile device application, a native application for a mobile device, a mobile cloud application for a mobile device, an electronic wallet application, and/or the like) stored and/or executed on user device 112.

Communication network 114 may include one or more wired and/or wireless networks. For example, communication network 114 may include a cellular network (e.g., a long-term evolution (LTE) network, a third generation (3G) network, a fourth generation (4G) network, a fifth generation network (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Figure 1B:
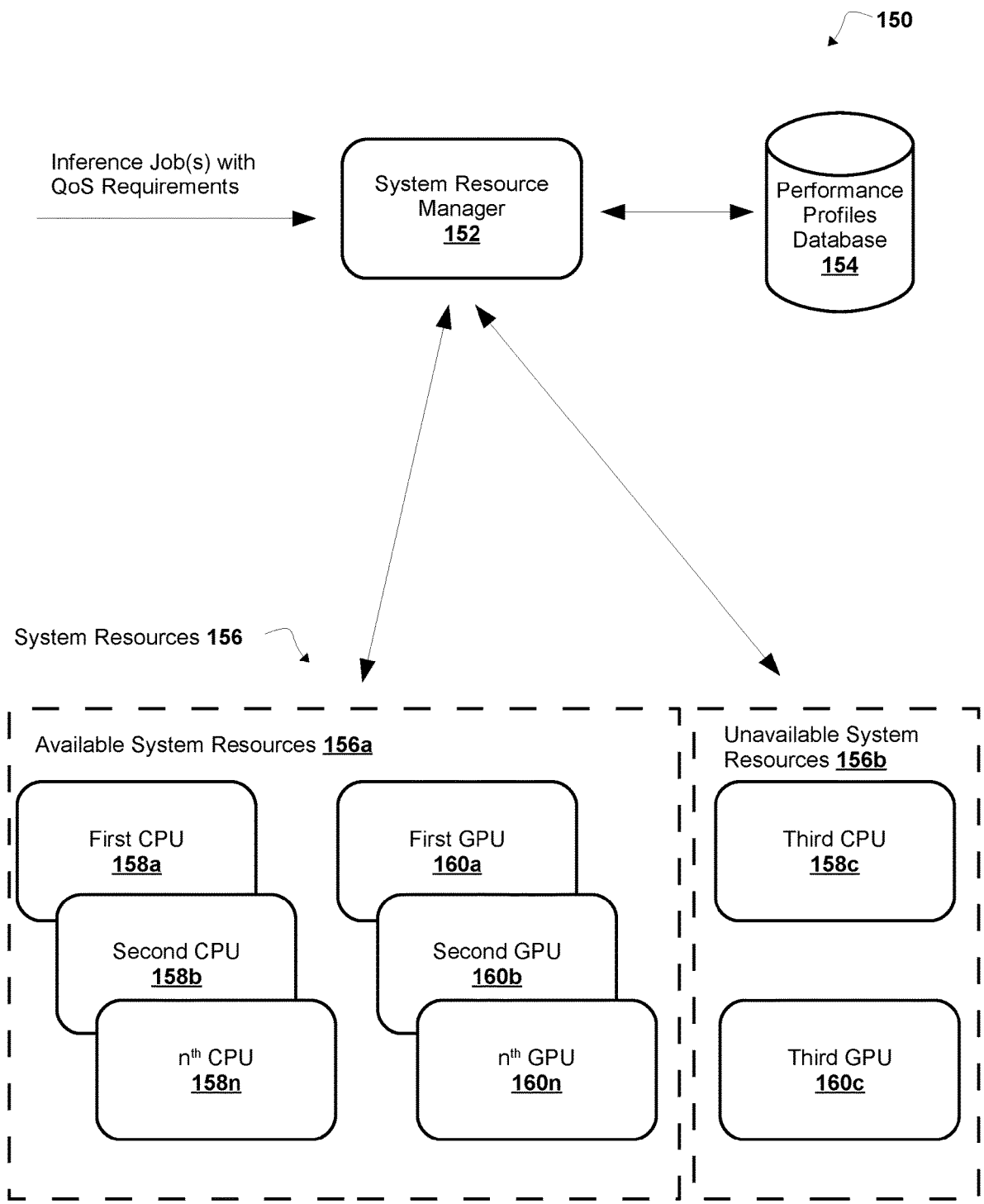
FIG. 1B is a diagram of non-limiting embodiments or aspects of a system for scheduling machine learning inference jobs.

Referring now to FIG. 1B, FIG. 1B is a diagram of non-limiting embodiments or aspects of a system for scheduling machine learning inference jobs 150. System 150 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.).

As shown in FIG. 1B, system 150 includes system resource manager 152, performance profiles database 154 and a plurality of system resources 156 (e.g., available system resources 156a including a first CPU 158a, a second CPU 158b, . . . an nth CPU 158n, a first GPU 160a, a second GPU 160b, . . . an nth GPU 160n and unavailable system resources 156b including a third CPU 158c, a third GPU 160, etc.). In some non-limiting embodiments or aspects, first CPU 158a and first GPU 160a may be implemented within a single device and/or system resource, second CPU 158b and second GPU 160b may be implemented within a single device and/or system resource, third CPU 158c and third GPU 160c may be implemented within a single device and/or system resource, nth CPU 158n and nth GPU 160n may be implemented within a single device and/or system resource, and/or the like.

Figure 3:
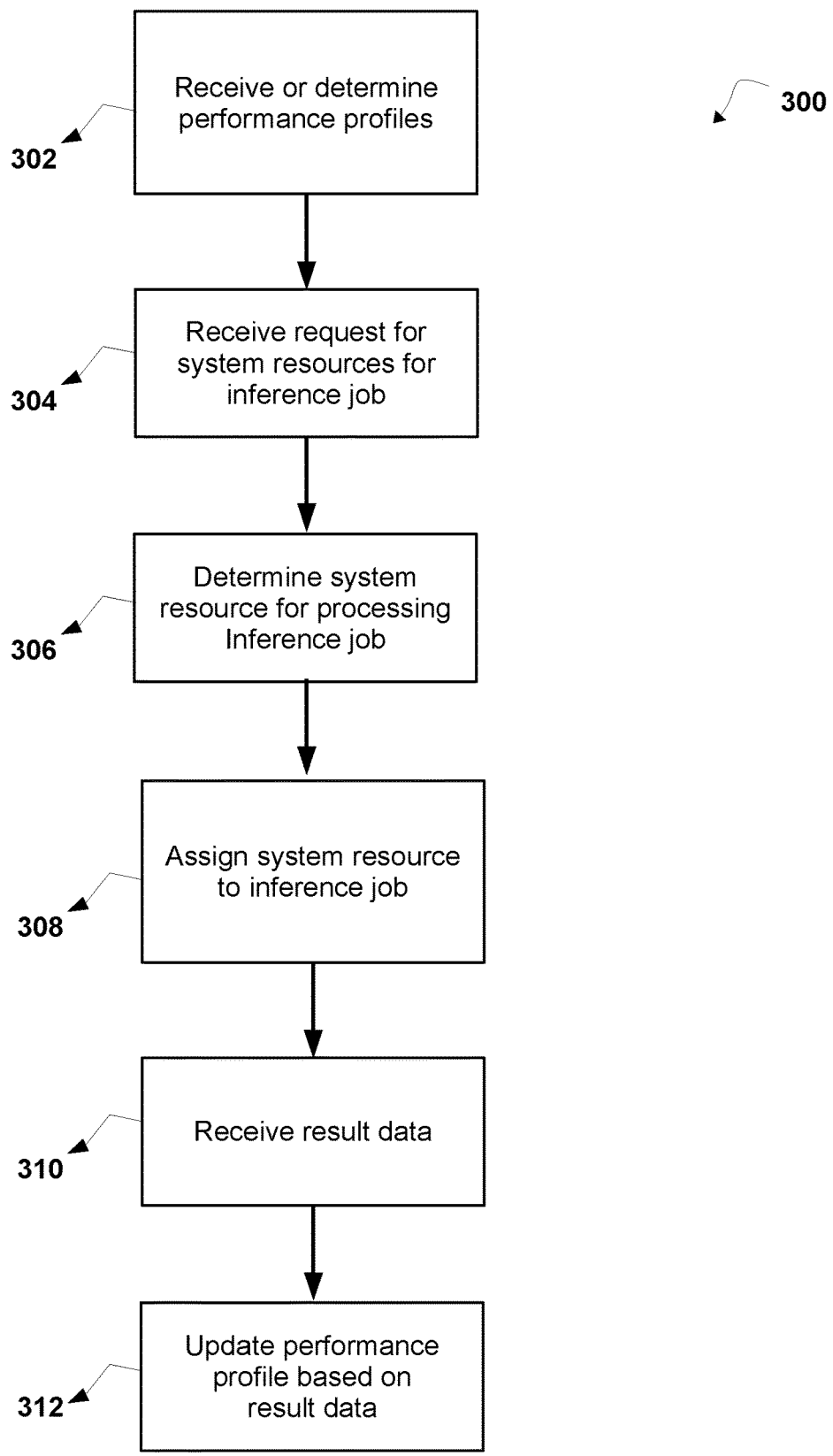
FIG. 3 is a flowchart of non-limiting embodiments or aspects of a process for scheduling machine learning inference jobs.
Figure 4:
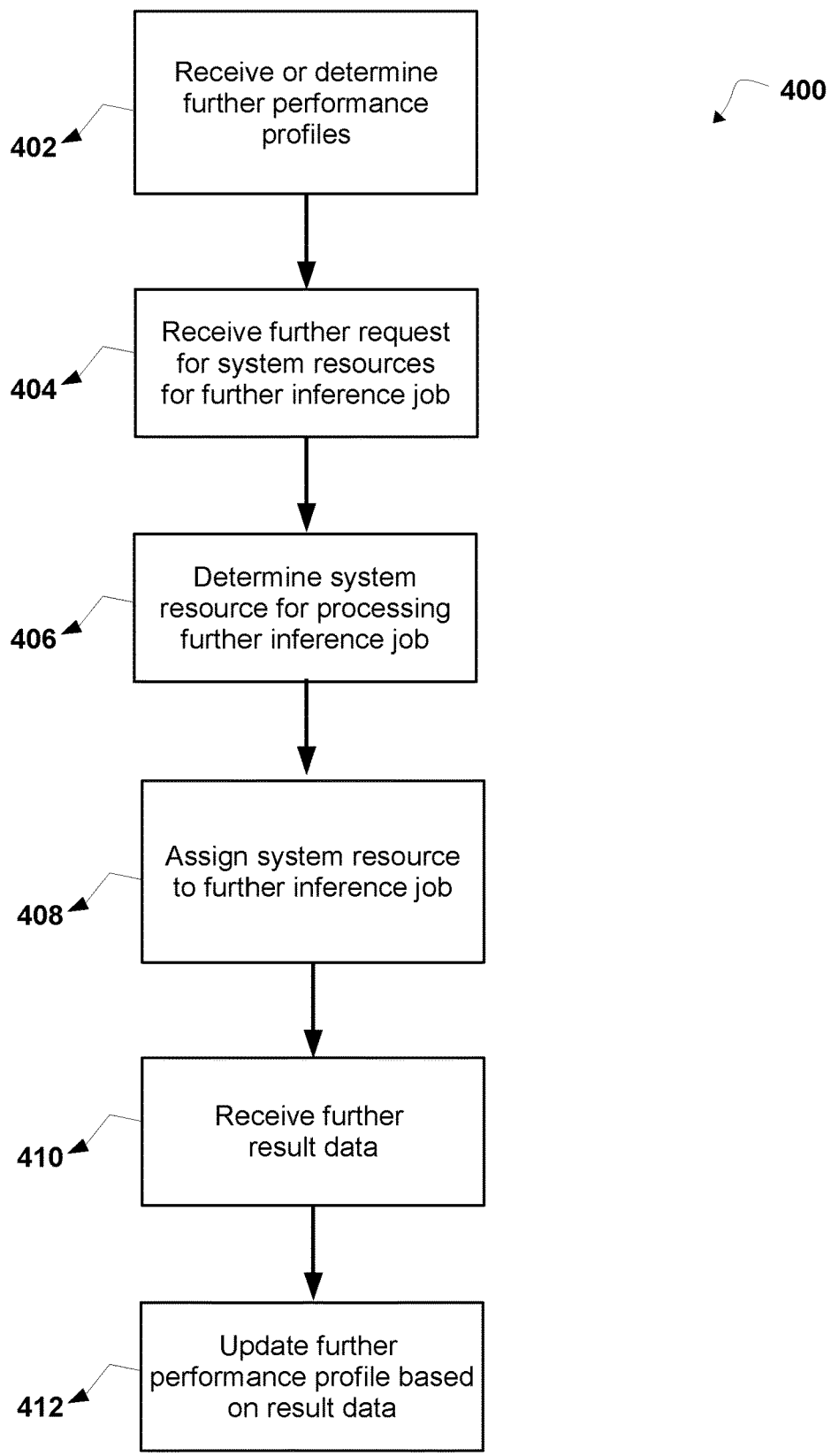
FIG. 4 is a flowchart of non-limiting embodiments or aspects of a process for scheduling machine learning inference jobs.

System resource manager 152 may include one or more devices capable of performing a process for scheduling machine learning inference jobs as described herein in more detail with respect to FIGS. 3 and 4. For example, system resource manager 152 may include a computing device, such as a server, a group of servers, and/or other like devices. Performance profiles database 154 may include one or more databases that are internal and/or external to system resource manager 152 and that store performance profiles associated with system resources. Available system resources 156a may include system resources that are available for assignment to an inference job associated with a machine learning model. Unavailable system resources 156b may include system resources that are not available for assignment to an inference job associated with a machine learning model. For example, an unavailable system resource 156b may include a system resource 156 that is currently processing another inference job.

The number and arrangement of devices and systems shown in FIGS. 1A and 1B is provided as an example. There may be additional devices and/or systems, fewer devices and/or systems, different devices and/or systems, or differently arranged devices and/or systems than those shown in FIGS. 1A and 1B. Furthermore, two or more devices and/or systems shown in FIGS. 1A and 1B may be implemented within a single device and/or system, or a single device and/or system shown in FIGS. 1A and 1B may be implemented as multiple, distributed devices and/or systems. Additionally, or alternatively, a set of devices and/or systems (e.g., one or more devices or systems) of environment 100 may perform one or more functions described as being performed by another set of devices and/or systems of environment 100.

Figure 2:
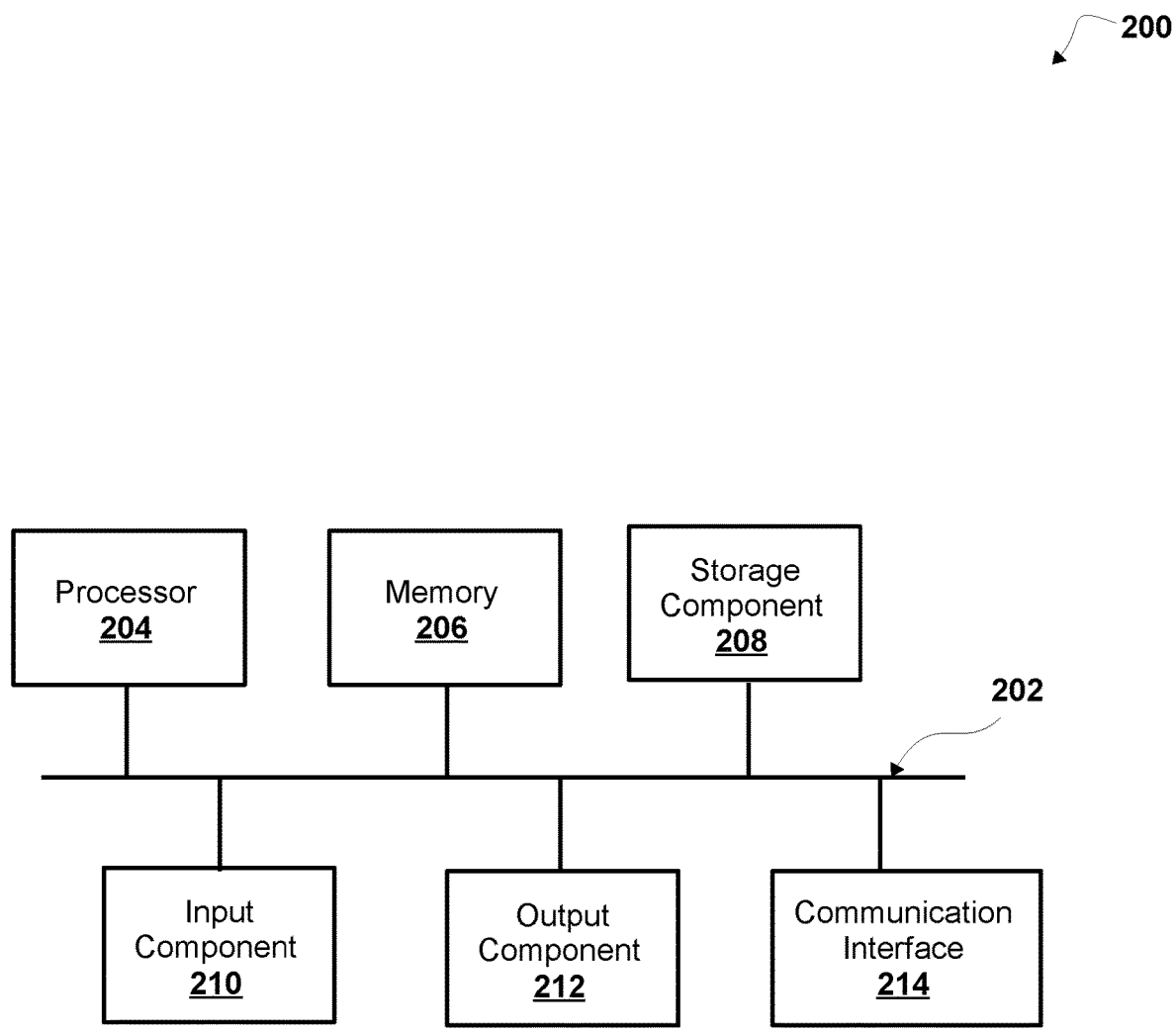
FIG. 2 is a diagram of non-limiting embodiments or aspects of components of one or more devices and/or one or more systems of FIGS. 1A and 1B.

Referring now to FIG. 2, FIG. 2 is a diagram of example components of a device 200. Device 200 may correspond to one or more devices of transaction processing network 101, one or more devices of merchant system 102, one or more devices of payment gateway system 104, one or more devices of acquirer system 106, one or more devices of transaction service provider system 108, one or more devices of issuer system 110, and/or user device 112 (e.g., one or more devices of a system of user device 112, etc.). In some non-limiting embodiments or aspects, one or more devices of transaction processing network 101, one or more devices of merchant system 102, one or more devices of payment gateway system 104, one or more devices of acquirer system 106, one or more devices of transaction service provider system 108, one or more devices of issuer system 110, user device 112 (e.g., one or more devices of a system of user device 112, etc.), and/or one or more devices of communication network 114 may include at least one device 200 and/or at least one component of device 200. As shown in FIG. 2, device 200 may include a bus 202, a processor 204, memory 206, a storage component 208, an input component 210, an output component 212, and a communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally, or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, etc.). Device 200 may be capable of receiving information from, storing information in, communicating information to, or searching information stored in the data storage or one or more data structures in memory 206 and/or storage component 208.

The number and arrangement of components shown in FIG. 2 are provided as an example. In some non-limiting embodiments or aspects, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Referring now to FIG. 3, FIG. 3 is a flowchart of non-limiting embodiments or aspects of a process 300 for scheduling machine learning inference jobs. In some non-limiting embodiments or aspects, one or more of the steps of process 300 may be performed (e.g., completely, partially, etc.) by transaction service provider system 108 (e.g., one or more devices of transaction service provider system 108, etc.). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 3, at step 302, process 300 includes receiving or determining performance profiles. For example, system resource manager 152 may receive or determine performance profiles. As an example, system resource manager 152 may receive or determine a plurality of performance profiles associated with a plurality of system resources 156. In such an example, each performance profile may be associated with a machine learning model.

In some non-limiting embodiments or aspects, a performance profile for a system resource includes a latency (e.g., an average latency, a minimum latency, a maximum latency, etc.) associated with a machine learning model for that system resource, a throughput (e.g., an average throughput, a minimum throughput, a maximum throughput, etc.) associated with a machine learning model for that system resource, and an availability of that system resource for processing an inference job associated with the machine learning model. A performance profile associated with a machine learning model for a system resource may be updated in response to that system resource being used to process an inference job using that machine learning model. An initial performance profile associated with a machine learning model for a system resource may be determined based on benchmarks associated with the system resource.

In some non-limiting embodiments or aspects, the plurality of system resources include at least one CPU 158 and at least one GPU 160. For example, the plurality of system resources may include a plurality of computing systems, and one or more of the computing systems may include at least one CPU 158 and/or at least one GPU 160.

In some non-limiting embodiments or aspects, a machine learning model may be programmed and/or configured to process an inference job. For example, a machine learning model may include a fraud detection model configured to process transaction data associated with a transaction at merchant system 102 to provide a prediction or inference of whether the transaction is a fraudulent transaction. As an example, a machine learning model may include a stand-in processing model configured to process transaction data associated with a transaction in transaction processing network 101 to provide a prediction or inference of whether to approve or deny authorization of the transaction.

As shown in FIG. 3, at step 304, process 300 includes receiving a request for system resources for an inference job. For example, system resource manager 152 may receive a request for system resources for an inference job. As an example, system resource manager 152 may receive a request for system resources for an inference job associated with the machine learning model. In such an example, the request for system resources for the inference job may include a quality of service requirements associated with the inference job.

In some non-limiting embodiments or aspects, a request for an inference job associated with a machine learning model may include a request for system resources to execute the machine learning model to process the inference job. For example, an inference job may include input data to which the machine learning model is to be applied to provide an inference or prediction associated with the input data. As an example, an inference job may include transaction data associated with a transaction at merchant system 102, and a system resource may execute the machine learning model to process the transaction data for a fraud detection model and/or a stand-in processing model.

In some non-limiting embodiments or aspects, transaction data may include parameters associated with a transaction, such as an account identifier (e.g., a PAN, etc.), a transaction amount, a transaction date and time, a type of products and/or services associated with the transaction, a conversion rate of currency, a type of currency, a merchant type, a merchant name, a merchant location, a transaction approval (and/or decline) rate, and/or the like.

In some non-limiting embodiments or aspects, a quality of service requirement includes at least one of a latency requirement (e.g., an average latency, a minimum latency, a maximum latency, etc.) for an inference job associated with a machine learning model and a throughput requirement (e.g., an average throughput, a minimum throughput, a maximum throughput, etc.) for the inference job associated with the machine learning model.

As shown in FIG. 3, at step 306, process 300 includes determining a system resource for processing an inference job. For example, system resource manager 152 may determine a system resource for processing an inference job. As an example, system resource manager 152 may determine a system resource of the plurality of system resources for processing the inference job associated with the machine learning model based on the plurality of performance profiles and a quality of service requirement associated with the inference job. In such an example, system resource manager 152 may filter a pool of system resources 156 for system resources that have performance profiles associated with the machine learning model that satisfy the quality of service requirement associated with the inference job for the machine learning model. For example, system resource manager 152 may determine one or more system resources from the pool of available system resources 156*a* have a latency profile and/or throughput profile that satisfy a latency requirement and/or throughput requirement of the inference job for the machine learning model. In some non-limiting embodiments or aspects, if more than one system resource is determined to satisfy the quality of service requirement, system resource manager 152 may select the resource having the best performance profile (e.g., a lowest latency, a highest throughput, etc.).

In some non-limiting embodiments or aspects, determining the system resource of the plurality of system resources for processing the inference job associated with the machine learning model includes assigning the inference job to one of a plurality of job queues based on the quality of service requirement associated with the inference job (e.g., a high priority queue, a medium priority queue, a low priority queue, etc.). For example, the plurality of job queues may be associated with a plurality of different priorities, and determining the system resource of the plurality of system resources for processing the inference job associated with the machine learning model is further based on a priority of a job queue to which the inference job is assigned. As an example, inference jobs in a higher priority job queue may be assigned system resources before inference jobs in lower priority job queues, and inference jobs in a same job queue may be assigned resources in the order in which the inference jobs are received and assigned to that job queue.

As shown in FIG. 3, at step 308, process 300 includes assigning a system resource to an inference job. For example, system resource manager 152 may assign a system resource to an inference job. As an example, system resource manager 152 may assign the system resource to the inference job for processing the inference job. In such an example, system resource manager 152 may assign the system resource determined in step 306 to the inference job for processing the inference job. For example, the assigned system resource may execute the machine learning model associated with the inference job to process the inference job to provide a prediction or inference associated with the inference job. In such an example, the performance profile for the system resource may be updated to indicate that the system resource is unavailable during processing of the inference job.

As shown in FIG. 3, at step 310, process 300 includes receiving result data. For example, system resource manager 152 may receive result data. As an example, system resource manager 152 may receive result data associated with processing of the inference job with the system resource.

In some non-limiting embodiments or aspects, result data may include a prediction or inference associated with processing an inference job of a machine learning model with a system resource, a latency associated with processing the inference job of the machine learning model with the system resource, a throughput associated with processing the inference job of the machine learning model associated with the system resource, or any combination thereof.

As shown in FIG. 3, at step 312, process 300 includes updating a performance profile based on result data. For example, system resource manager 152 may update a performance profile based on result data. As an example, system resource manager 152 may update, based on the result data, a performance profile of the plurality of the performance profiles associated with the system resource and the machine learning model. In such an example, in response to receiving the result data associated with processing of the inference job with the system resource, system resource manager 152 may automatically and dynamically update the performance profile of the system resource for the machine learning model associated with the inference job. For example, system resource manager 152 may update a latency, a throughput, and/or an availability of the system resource for processing an inference job using the machine learning model.

Referring now to FIG. 4, FIG. 4 is a flowchart of non-limiting embodiments or aspects of a process 400 for scheduling machine learning inference jobs. In some non-limiting embodiments or aspects, one or more of the steps of process 400 may be performed (e.g., completely, partially, etc.) by transaction service provider system 108 (e.g., one or more devices of transaction service provider system 108, etc.). In some non-limiting embodiments or aspects, one or more of the steps of process 300 may be performed (e.g., completely, partially, etc.) by another device or a group of devices separate from or including transaction service provider system 108, such as merchant system 102 (e.g., one or more devices of merchant system 102), payment gateway system 104 (e.g., one or more devices of payment gateway system 104), acquirer system 106 (e.g., one or more devices of acquirer system 106), issuer system 110 (e.g., one or more devices of issuer system 110), and/or user device 112 (e.g., one or more devices of a system of user device 112).

As shown in FIG. 4, at step 402, process 400 includes receiving or determining further performance profiles. For example, system resource manager 152 may receive or determine further performance profiles. As an example, system resource manager 152 may receive or determine a plurality of further performance profiles associated with the plurality of system resources. In such an example, each further performance profile may be associated with a further machine learning model different than the machine learning model.

As shown in FIG. 4, at step 404, process 400 includes receiving a further request for system resources for a further inference job. For example, system resource manager 152 may receive a further request for system resources for a further inference job. As an example, system resource manager 152 may receive a further request for system resources for a further inference job associated with the further machine learning model.

As shown in FIG. 4, at step 406, process 400 includes determining a system resource for processing a further inference job. For example, system resource manager 152 may determine a system resource for processing a further inference job. As an example, system resource manager 152 may determine a further system resource of the plurality of system resources for processing the further inference job associated with the further machine learning model based on the plurality of further performance profiles and a further quality of service requirement associated with the further inference job.

As shown in FIG. 4, at step 408, process 400 includes assigning a system resource to a further inference job. For example, system resource manager 152 may assign a system resource to a further inference job. As an example, system resource manager 152 may assign the further system resource to the inference job for processing the inference job. In some non-limiting embodiments or aspects, the further system resource may be different than the system resource discussed herein with respect to step 308. In some non-limiting embodiments or aspects, the further system resource may be the same as the system resource discussed herein with respect to step 308. For example, the further system resource may be assigned to the further inference job before or after that system resource is assigned to the other inference job (e.g., before or after the other inference job is finished processing by the system resource, etc.).

As shown in FIG. 4, at step 410, process 400 includes receiving further result data. For example, system resource manager 152 may receive further result data. As an example, system resource manager 152 may receive further result data associated with processing of the further inference job with the further system resource.

As shown in FIG. 4, at step 412, process 400 includes updating a further performance profile based on result data. For example, system resource manager 152 may update a further performance profile based on result data. As an example, system resource manager 152 may update, based on the further result data, a further performance profile of the plurality of the performance profiles associated with the system resource and the further machine learning model Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
  receiving or determining, with at least one processor, a plurality of performance profiles associated with a plurality of system resources, wherein each performance profile is associated with a machine learning model, wherein each performance profile for each system resource includes a latency associated with the machine learning model for that system resource, a throughput associated with the machine learning model for that system resource, and an availability of that system resource for processing an inference job associated with the machine learning model, and wherein the plurality of system resources includes at least one central processing unit (CPU) and at least one graphics processing unit (GPU);

receiving, with at least one processor, a request for system resources for the inference job associated with the machine learning model;

determining, with at least one processor, a system resource of the plurality of system resources for processing the inference job associated with the machine learning model based on the plurality of performance profiles and a quality of service requirement associated with the inference job; and assigning, with at least one processor, the system resource to the inference job for processing the inference job, wherein the system resource assigned to the inference job executes the machine learning model associated with the inference job to process the inference job.

2. The computer-implemented method of claim 1, further comprising:

receiving, with at least one processor, result data associated with processing of the inference job with the system resource; and updating, with at least one processor, based on the result data, a performance profile of the plurality of the performance profiles associated with the system resource and the machine learning model.

3. The computer-implemented method of claim 2, wherein the result data includes at least one of the following: a latency associated with processing the inference job of the machine learning model with the system resource, a throughput associated with processing the inference job of the machine learning model with the system resource, or any combination thereof.

4. The computer-implemented method of claim 1, wherein the quality of service requirement includes at least one of a latency requirement for the inference job associated with the machine learning model and a throughput requirement for the inference job associated with the machine learning model.

5. The computer-implemented method of claim 1, wherein determining the system resource of the plurality of system resources for processing the inference job associated with the machine learning model includes assigning the inference job to one of a plurality of job queues based on the quality of service requirement associated with the inference job, wherein the plurality of job queues are associated with a plurality of different priorities, and wherein determining the system resource of the plurality of system resources for processing the inference job associated with the machine learning model is further based on a priority of a job queue to which the inference job is assigned.

6. The computer-implemented method of claim 2, further comprising:

receiving or determining, with at least one processor, a plurality of further performance profiles associated with the plurality of system resources, wherein each further performance profile is associated with a further machine learning model different than the machine learning model;

receiving, with at least one processor, a further request for system resources for a further inference job associated with the further machine learning model;

determining, with at least one processor, a further system resource of the plurality of system resources for processing the further inference job associated with the further machine learning model based on the plurality of further performance profiles and a further quality of service requirement associated with the further inference job;

assigning, with at least one processor, the further system resource to the inference job for processing the inference job;

receiving, with at least one processor, further result data associated with processing of the further inference job with the further system resource; and updating, with at least one processor, based on the further result data, a further performance profile of the plurality of the performance profiles associated with the system resource and the further machine learning model.

7. The computer-implemented method of claim 6, wherein the system resource and the further system resource include a same system resource.

8. A computing system, comprising:

one or more processors programmed and/or configured to:

receive or determine a plurality of performance profiles associated with a plurality of system resources, wherein each performance profile is associated with a machine learning model, wherein each performance profile for each system resource includes a latency associated with the machine learning model for that system resource, a throughput associated with the machine learning model for that system resource, and an availability of that system resource for processing an inference job associated with the machine learning model, and wherein the plurality of system resources includes at least one central processing unit (CPU) and at least one graphics processing unit (GPU);

receive a request for system resources for the inference job associated with the machine learning model;

determine a system resource of the plurality of system resources for processing the inference job associated with the machine learning model based on the plurality of performance profiles and a quality of service requirement associated with the inference job; and assign the system resource to the inference job for processing the inference job, wherein the system resource assigned to the inference job executes the machine learning model associated with the inference job to process the inference job.

9. The computing system of claim 8, wherein the one or more processors are further programmed and/or configured to:

receive result data associated with processing of the inference job with the system resource; and update, based on the result data, a performance profile of the plurality of the performance profiles associated with the system resource and the machine learning model.

10. The computing system of claim 9, wherein the result data includes at least one of the following: a latency associated with processing the inference job of the machine learning model with the system resource, a throughput associated with processing the inference job of the machine learning model with the system resource, or any combination thereof.

11. The computing system of claim 8, wherein the quality of service requirement includes at least one of a latency requirement for the inference job associated with the machine learning model and a throughput requirement for the inference job associated with the machine learning model.

12. The computing system of claim 8, wherein determining the system resource of the plurality of system resources for processing the inference job associated with the machine learning model includes assigning the inference job to one of a plurality of job queues based on the quality of service requirement associated with the inference job, wherein the plurality of job queues are associated with a plurality of different priorities, and wherein determining the system resource of the plurality of system resources for processing the inference job associated with the machine learning model is further based on a priority of a job queue to which the inference job is assigned.

13. The computing system of claim 9, wherein the one or more processors are further programmed and/or configured to:
  receive or determine a plurality of further performance profiles associated with the plurality of system resources, wherein each further performance profile is associated with a further machine learning model different than the machine learning model;
  receive a further request for system resources for a further inference job associated with the further machine learning model;
  determine a further system resource of the plurality of system resources for processing the further inference job associated with the further machine learning model based on the plurality of further performance profiles and a further quality of service requirement associated with the further inference job;
  assign the further system resource to the inference job for processing the inference job;
  receive further result data associated with processing of the further inference job with the further system resource; and
  update based on the further result data, a further performance profile of the plurality of the performance profiles associated with the system resource and the further machine learning model.

14. The computing system of claim 13, wherein the system resource and the further system resource include a same system resource.

15. A computer program product comprising at least one non-transitory computer-readable medium including program instructions that, when executed by at least one processor, cause the at least one processor to:
  receive or determine a plurality of performance profiles associated with a plurality of system resources, wherein each performance profile is associated with a machine learning model, wherein each performance profile for each system resource includes a latency associated with the machine learning model for that system resource, a throughput associated with the machine learning model for that system resource, and an availability of that system resource for processing an inference job associated with the machine learning model, and wherein the plurality of system resources includes at least one central processing unit (CPU) and at least one graphics processing unit (GPU);
  receive a request for system resources for the inference job associated with the machine learning model;
  determine a system resource of the plurality of system resources for processing the inference job associated with the machine learning model based on the plurality of performance profiles and a quality of service requirement associated with the inference job; and
  assign the system resource to the inference job for processing the inference job, wherein the system resource assigned to the inference job executes the machine learning model associated with the inference job to process the inference job.

16. The computer program product of claim 15, wherein the program instructions, when executed by the at least one processor, further cause the at least one processor to:
  receive result data associated with processing of the inference job with the system resource; and
  update, based on the result data, a performance profile of the plurality of the performance profiles associated with the system resource and the machine learning model.

17. The computer program product of claim 16, wherein the result data includes at least one of the following: a latency associated with processing the inference job of the machine learning model with the system resource, a throughput associated with processing the inference job of the machine learning model with the system resource, or any combination thereof.

18. The computer program product of claim 15, wherein the quality of service requirement includes at least one of a latency requirement for the inference job associated with the machine learning model and a throughput requirement for the inference job associated with the machine learning model.

19. The computer program product of claim 15, wherein determining the system resource of the plurality of system resources for processing the inference job associated with the machine learning model includes assigning the inference job to one of a plurality of job queues based on the quality of service requirement associated with the inference job, wherein the plurality of job queues are associated with a plurality of different priorities, and wherein determining the system resource of the plurality of system resources for processing the inference job associated with the machine learning model is further based on a priority of a job queue to which the inference job is assigned.

20. The computer program product of claim 16, wherein the program instructions, when executed by the at least one processor, cause the at least one processor to:
  receive or determine a plurality of further performance profiles associated with the plurality of system resources, wherein each further performance profile is associated with a further machine learning model different than the machine learning model;
  receive a further request for system resources for a further inference job associated with the further machine learning model;
  determine a further system resource of the plurality of system resources for processing the further inference job associated with the further machine learning model based on the plurality of further performance profiles and a further quality of service requirement associated with the further inference job;
  assign the further system resource to the inference job for processing the inference job;
  receive further result data associated with processing of the further inference job with the further system resource; and
  update based on the further result data, a further performance profile of the plurality of the performance profiles associated with the system resource and the further machine learning model, wherein the system resource and the further system resource include a same system resource.

\* \* \* \* \*